(12) United States Patent
Luo et al.

(10) Patent No.: US 12,050,971 B2
(45) Date of Patent: Jul. 30, 2024

(54) TRANSACTION COMPOSITION GRAPH NODE EMBEDDING

(71) Applicant: International Business Machines Corporation, Armonk, NY (US)

(72) Inventors: Yan Luo, Concord (CA); Liujia Shao, Markham (CA); Yan Xu, Richmond Hill (CA)

(73) Assignee: International Business Machines Corporation, Armonk, NY (US)

( * ) Notice: Subject to any disclaimer, the term of this patent is extended or adjusted under 35 U.S.C. 154(b) by 882 days.

(21) Appl. No.: 17/110,373

(22) Filed: Dec. 3, 2020

(65) Prior Publication Data
US 2022/0180240 A1    Jun. 9, 2022

(51) Int. Cl.
*G06N 3/047* (2023.01)
*G06F 16/901* (2019.01)
*G06N 20/00* (2019.01)

(52) U.S. Cl.
CPC ......... *G06N 20/00* (2019.01); *G06F 16/9024* (2019.01); *G06F 16/9027* (2019.01); *G06N 3/047* (2023.01)

(58) Field of Classification Search
CPC .... G06N 20/00; G06N 3/047; G06F 16/9027; G06F 16/9024
See application file for complete search history.

(56) References Cited

U.S. PATENT DOCUMENTS

| | | | |
|---|---|---|---|
| 9,690,546 B2 | 6/2017 | Ben Jemaa | |
| 11,238,966 B2* | 2/2022 | Frieder | G06N 7/01 |
| 2020/0074301 A1* | 3/2020 | Shang | G06N 5/022 |
| 2020/0151289 A1* | 5/2020 | Sikka | G06N 3/063 |
| 2021/0074295 A1* | 3/2021 | Moreno | G10L 15/005 |
| 2021/0264202 A1* | 8/2021 | Kalluri | G06F 18/23 |
| 2022/0101401 A1* | 3/2022 | Zhao | G06Q 30/06 |
| 2022/0150123 A1* | 5/2022 | Kim | G06F 16/9024 |

OTHER PUBLICATIONS

Grover et al., "node2vec: Scalable Feature Learning for Networks", KDD '16, Aug. 13-17, 2016, San Francisco, CA, USA, DOI: http://dx.doi.org/10.1145/2939672.2939754, 10 pages.
IBM, "Analyzing transactions with the Transaction Composition graph", Downloaded from the Internet on Mar. 30, 2020, <https://www.ibm.com/support/knowledgecenter/en/SSKK7E_5.0.2/ com. ibm.adi.product.doc/topics/transacopgraph.html>, 4 pages.
IBM, "End-to-end system performance root cause analysis", downloaded from the Internet on Mar. 30, 2020, <https://www.ibm.com/support/knowledgecenter/en/SSKK7E_5.0.3/com.ibm.adi. product. doc/topics/endcause.html>, 13 pages.
(Continued)

*Primary Examiner* — Beau D Spratt
(74) *Attorney, Agent, or Firm* — Edward J. Wixted, III

(57) ABSTRACT

A computer-implemented process for transaction composition graph node embedding comprising traversing a data flow of transactions to convert a full graph to multiple directed acyclic subgraphs/paths in spanning trees, taking one-by-one nodes as input to a predetermined neural network, generating a set of one-hot vectors for all nodes, computing an embedding vector from a corresponding one-hot vector, computing a probability that an output node is nearby, and embedding the node to a latent feature vector.

3 Claims, 9 Drawing Sheets

(56) References Cited

OTHER PUBLICATIONS

Naumov et al., "Parallel Depth-First Search for Directed Acyclic Graphs", NVIDIA Technical Report NVR-2017-001, Mar. 2017, copyright 2017 NVIDIA Corporation, 28 pages.
Rallapalli et al., "SENSE: Semantically Enhanced Node Sequence Embedding", arXiv:1911.02970v1 [cs.LG] Nov. 7, 2019, 11 pages.
Tennakoon et al., "MH-DAGMiner: maximal hierarchical sub-DAG mining in directed weighted networks", Knowledge and Information Systems, https://doi.org/10.1007/s10115-018-1300-0, Revised: Sep. 17, 2018 / Accepted: Nov. 24, 2018, Published online: Dec. 14, 2018, © Springer-Verlag London Ltd., part of Springer Nature 2018, 32 pages.

* cited by examiner

TRANSACTION COMPOSITION GRAPH NODE EMBEDDING

BACKGROUND

The present invention relates generally to the field of computer software, and more particularly to data management.

The Wikipedia entry for "word2vec" (as of Oct. 29, 2020) states, in part, as follows: "Word2vec is a technique for natural language processing. The word2vec algorithm uses a neural network model to learn word associations from a large corpus of text. Once trained, such a model can detect synonymous words or suggest additional words for a partial sentence. As the name implies, word2vec represents each distinct word with a particular list of numbers called a vector. The vectors are chosen carefully such that a simple mathematical function (the cosine similarity between the vectors) indicates the level of semantic similarity between the words represented by those vectors . . . . Word2vec is a group of related models that are used to produce word embeddings. These models are shallow, two-layer neural networks that are trained to reconstruct linguistic contexts of words. Word2vec takes as its input a large corpus of text and produces a vector space, typically of several hundred dimensions, with each unique word in the corpus being assigned a corresponding vector in the space. Word vectors are positioned in the vector space such that words that share common contexts in the corpus are located close to one another in the space . . . . Word2vec can utilize either of two model architectures to produce a distributed representation of words: continuous bag-of-words (CBOW) or continuous skip-gram. In the continuous bag-of-words architecture, the model predicts the current word from a window of surrounding context words. The order of context words does not influence prediction (bag-of-words assumption). In the continuous skip-gram architecture, the model uses the current word to predict the surrounding window of context words. The skip-gram architecture weighs nearby context words more heavily than more distant context words . . . . A Word2vec model can be trained with hierarchical SoftMax and/or negative sampling. To approximate the conditional log-likelihood a model seeks to maximize, the hierarchical SoftMax method uses a Huffman tree to reduce calculation . . . . The reasons for successful word embedding learning in the word2vec framework are poorly understood." (footnotes omitted)

CBOW and skip gram are two types of word2vec algorithms, not sure if they are combined. Graph embedding contexts, such as node2vec, sometimes make use of skip gram. Word2vec is a specific example of a specific embedding model, and more specifically is a specific embedding algorithm for word embedding (sometimes herein referred to as "specific embedding algorithm for words"), rather than something that works with an embedding model but is separate from it. An embedding algorithm tries to learn a latent feature vector from an entity such as a word, paragraph, document. The word2vec algorithm is one example of a broader category herein called "embedding and/or feature learning algorithms."

The Wikipedia entry for "feature learning" (as of Oct. 19, 2020) states, in part, as follows: "In machine learning, feature learning or representation learning is a set of techniques that allows a system to automatically discover the representations needed for feature detection or classification from raw data. This replaces manual feature engineering and allows a machine to both learn the features and use them to perform a specific task. Feature learning is motivated by the fact that machine learning tasks such as classification often require input that is mathematically and computationally convenient to process. However, real-world data such as images, video, and sensor data has not yielded to attempts to algorithmically define specific features . . . . Feature learning can be either supervised or unsupervised. In supervised feature learning, features are learned using labeled input data. Examples include supervised neural networks, multi-layer perceptron and (supervised) dictionary learning. In unsupervised feature learning, features are learned with unlabeled input data. Examples include dictionary learning, independent component analysis, autoencoders, matrix factorization and various forms of clustering." (footnotes omitted)

Typically, the main purpose of deep neural networks is to learn the features from images/videos/sensor data. Thus, for high-dimensional unstructured data like video or text, the learning algorithms are typically applied to extract features. Matrix factorization can be supervised especially used in a recommender system. For example, one type of machine learning (ML)/artificial intelligence (AI) type recommender system that is currently used is a recommender system is a software system to recommend similar items to users based on how the user's historical selections or preference or other similar users' choice.

Feature vectors are generated by feature learning or embedding algorithms as the output. "Transaction composition graph" is defined as follows: a graph data structure designed to aid in analysis of the transactions within a project (sometimes also referred to as an "application" or "enterprise application"). Typically, in the prior art, a transaction composition graph: (i) shows all artifacts (transactions, programs, and database tables) calling in a transaction; (ii) gives the visual overview structure about the transaction; and (iii) allows users to analyze potential risk or interest areas of all the artifacts within a transaction based on relationships. Typically, in a transaction composition graph, each edge represents a program artifact calls/uses/refers another program artifact, such as a program A invokes program B or program A uses a database, or program A uses variable definitions in a copybook, etc. It is known that the edge of a transaction composition graph may be bidirectional. Typically, the edges do not have weights associated with them.

SUMMARY

According to an aspect of the present invention, there is a method, computer program product and/or system that performs the following operations (not necessarily in the following order): (i) receiving an embedding model; (ii) training the embedding model using machine learning (ML); (iii) receiving a first transaction composition graph including information indicative of a transaction composition graph data structure that includes: (a) a plurality of transaction composition graph nodes including a first composition graph node, and (b) a plurality of transaction composition connections defined between various pairs of transaction composition nodes; (iv) receiving a first feature vector; and (v) embedding the first transaction composition graph node into a feature vector.

DETAILED DESCRIPTION

Figure 1:
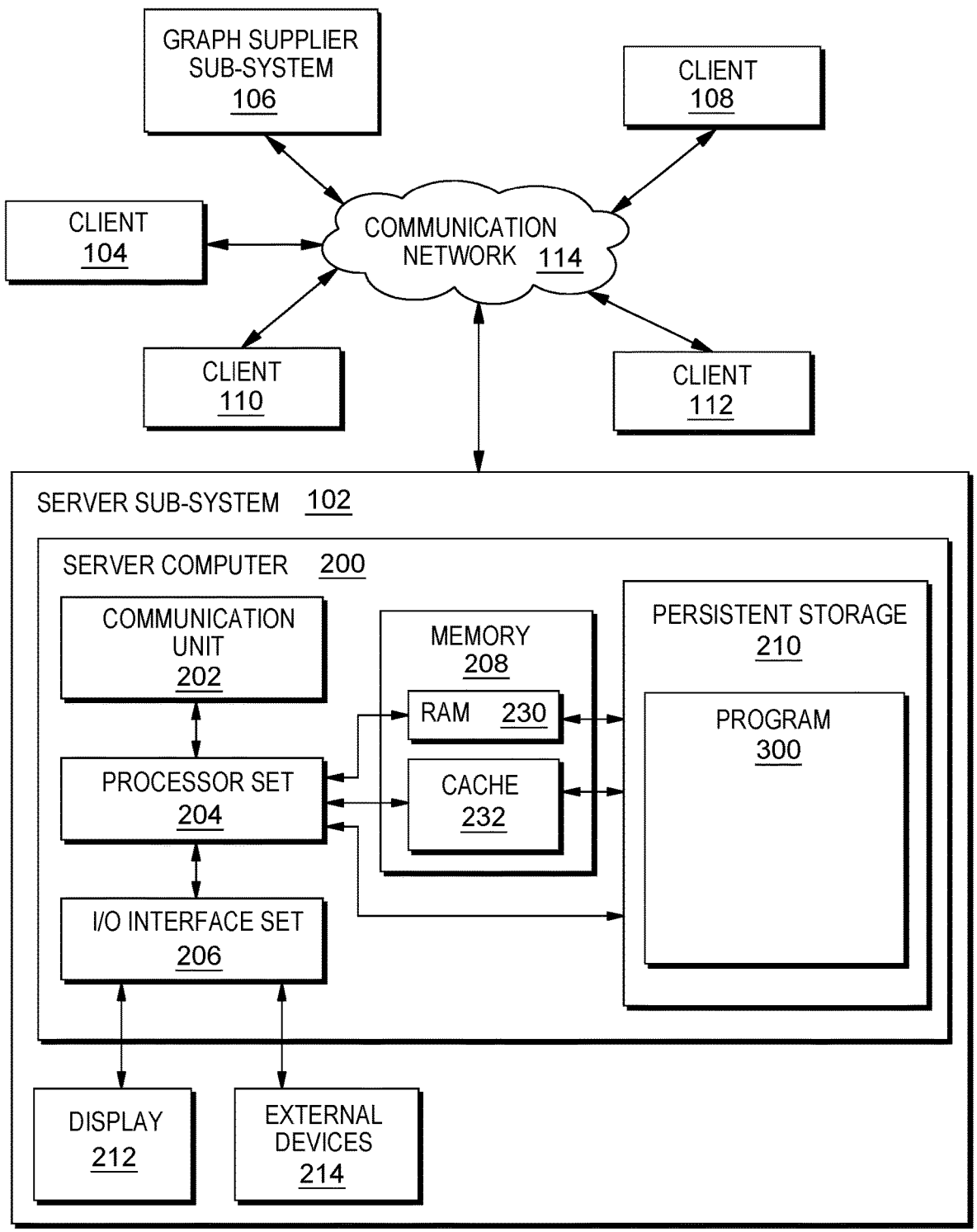
FIG. 1 is a block diagram of a first embodiment of a system according to the present invention.

Some embodiments of the present invention are directed to a computer-implemented process for transaction composition graph node embedding comprising traversing a data flow of transactions to convert a full graph to multiple directed acyclic subgraphs/paths in spanning trees, taking one-by-one nodes as input to a predetermined neural network, generating a set of one-hot vectors for all nodes, computing an embedding vector from a corresponding one-hot vector, computing a probability that an output node is nearby, and embedding the node to a latent feature vector.

This Detailed Description section is divided into the following subsections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product at any possible technical detail level of integration. The computer program product may include a computer readable storage medium (or media) having computer readable program instructions thereon for causing a processor to carry out aspects of the present invention. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

A "storage device" is hereby defined to be anything made or adapted to store computer code in a manner so that the computer code can be accessed by a computer processor. A storage device typically includes a storage medium, which is the material in, or on, which the data of the computer code is stored. A single "storage device" may have: (i) multiple discrete portions that are spaced apart, or distributed (for example, a set of six solid state storage devices respectively located in six laptop computers that collectively store a single computer program); and/or (ii) may use multiple storage media (for example, a set of computer code that is partially stored in as magnetic domains in a computer's non-volatile storage and partially stored in a set of semiconductor switches in the computer's volatile memory). The term "storage medium" should be construed to cover situations where multiple different types of storage media are used.

Computer readable program instructions described herein can be downloaded to respective computing/processing devices from a computer readable storage medium or to an external computer or external storage device via a network, for example, the internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As shown in FIG. 1, networked computers system 100 is an embodiment of a hardware and software environment for use with various embodiments of the present invention. Networked computers system 100 includes: server subsystem 102 (sometimes herein referred to, more simply, as subsystem 102); client subsystems 104, 108, 110, 112; graph supplier sub-system 106; and communication network 114. Server subsystem 102 includes: server computer 200; communication unit 202; processor set 204; input/output (I/O) interface set 206; memory 208; persistent storage 210; display 212; external device(s) 214; random access memory (RAM) 230; cache 232; and program 300.

Subsystem 102 may be a laptop computer, tablet computer, netbook computer, personal computer (PC), a desktop computer, a personal digital assistant (PDA), a smart phone, or any other type of computer (see definition of "computer" in Definitions section, below). Program 300 is a collection of machine readable instructions and/or data that is used to create, manage and control certain software functions that will be discussed in detail, below, in the Example Embodiment subsection of this Detailed Description section.

Subsystem 102 is capable of communicating with other computer subsystems via communication network 114. Network 114 can be, for example, a local area network (LAN), a wide area network (WAN) such as the internet, or a combination of the two, and can include wired, wireless, or fiber optic connections. In general, network 114 can be any combination of connections and protocols that will support communications between server and client subsystems.

Subsystem 102 is shown as a block diagram with many double arrows. These double arrows (no separate reference numerals) represent a communications fabric, which provides communications between various components of subsystem 102. This communications fabric can be implemented with any architecture designed for passing data and/or control information between processors (such as microprocessors, communications and network processors, etc.), system memory, peripheral devices, and any other hardware components within a computer system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for subsystem 102; and/or (ii) devices external to subsystem 102 may be able to provide memory for subsystem 102. Both memory 208 and persistent storage 210: (i) store data in a manner that is less transient than a signal in transit; and (ii) store data on a tangible medium (such as magnetic or optical domains). In this embodiment, memory 208 is volatile storage, while persistent storage 210 provides nonvolatile storage. The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202 provides for communications with other data processing systems or devices external to subsystem 102. In these examples, communications unit 202 includes one or more network interface cards. Communications unit 202 may provide communications through the use of either or both physical and wireless communications links. Any software modules discussed herein may be downloaded to a persistent storage device (such as persistent storage 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. I/O interface set 206 also connects in data communication with display 212. Display 212 is a display device that provides a mechanism to display data to a user and may be, for example, a computer monitor or a smart phone display screen.

In this embodiment, program 300 is stored in persistent storage 210 for access and/or execution by one or more computer processors of processor set 204, usually through one or more memories of memory 208. It will be understood by those of skill in the art that program 300 may be stored in a more highly distributed manner during its run time and/or when it is not running. Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
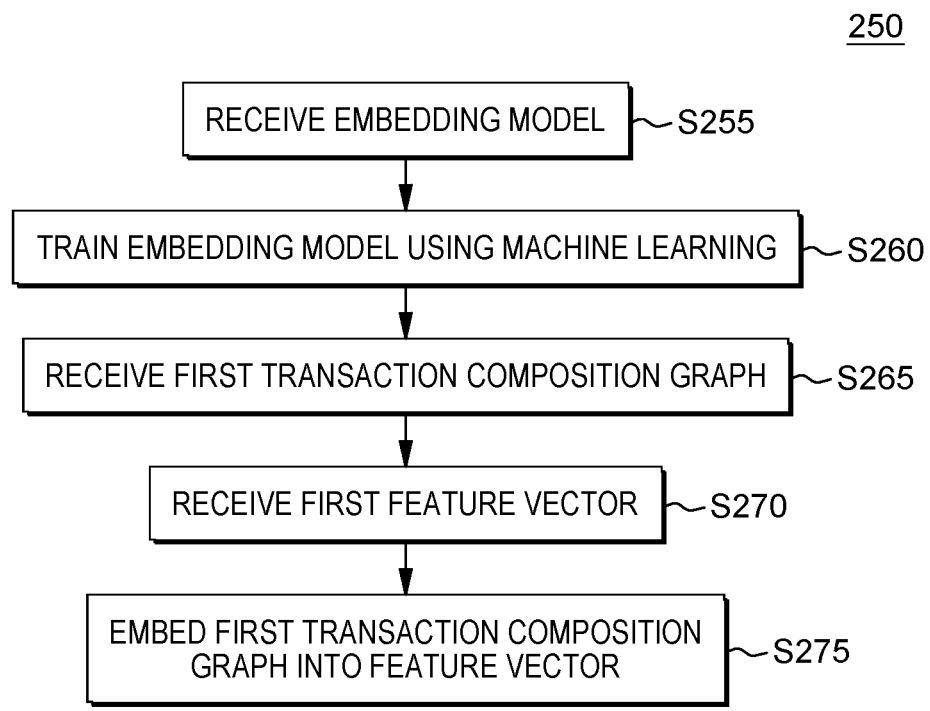
FIG. 2 is a flowchart showing a first embodiment method performed, at least in part, by the first embodiment system.
Figure 3:
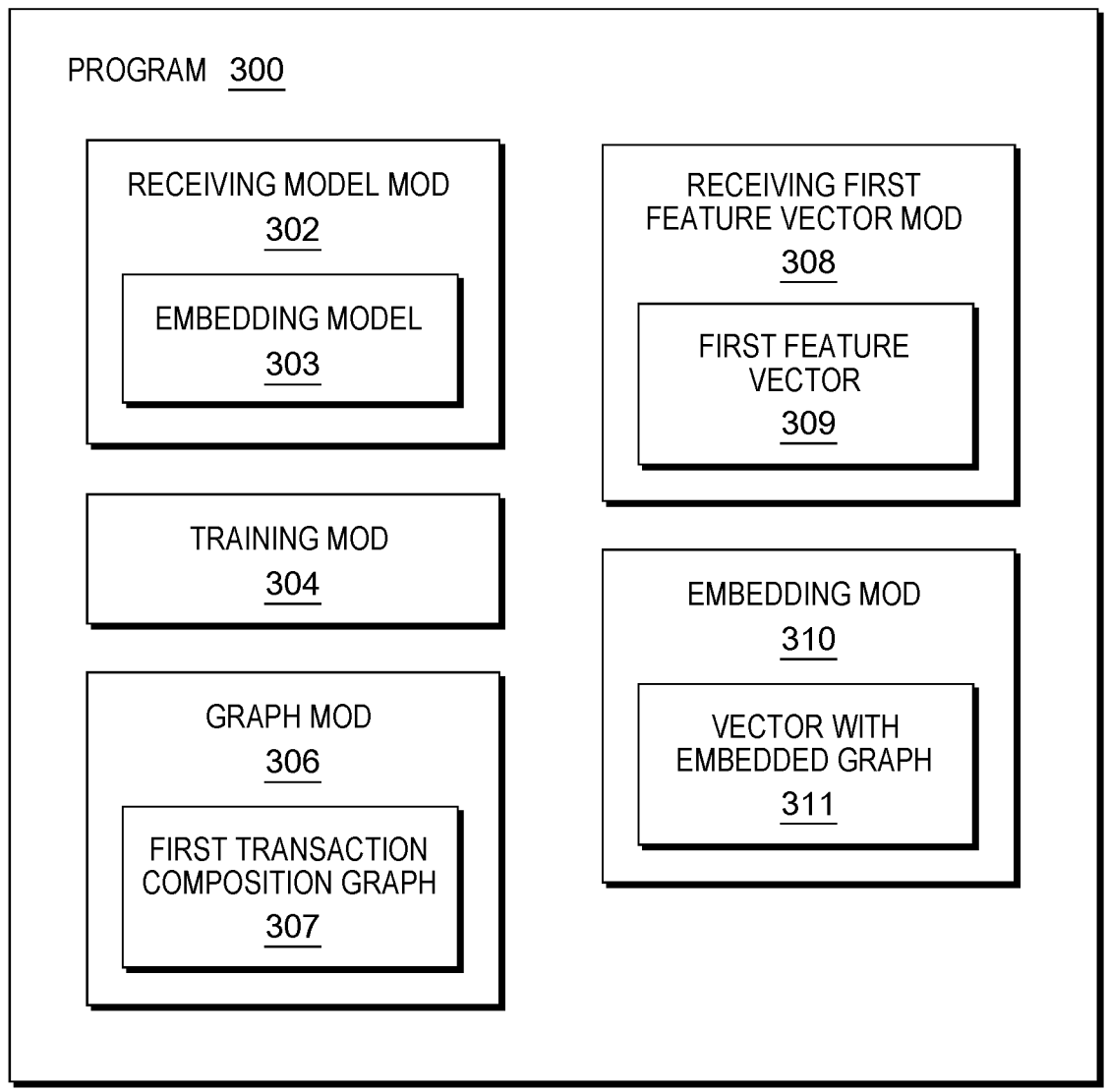
FIG. 3 is a block diagram showing a machine logic (for example, software) portion of the first embodiment system.

As shown in FIG. 1, networked computers system 100 is an environment in which an example method according to the present invention can be performed. As shown in FIG. 2, flowchart 250 shows an example method according to the present invention. As shown in FIG. 3, program 300 performs or controls performance of at least some of the method operations of flowchart 250. This method and associated software will now be discussed, over the course of the following paragraphs, with extensive reference to the blocks of FIGS. 1, 2 and 3.

Processing begins at operation S255, where receiving model module ("mod") 302 receives an embedding model 303. Embedding model 303 is received from client subsystem 104, and through communication network 114. In this embodiment, machine learning algorithms have built an initial version of the embedding model based on sample data, known as "training data" (or "training data sets"). The embedding model is machine logic that functions to determine embedding decisions without having the embedding decisions being decided in a predetermined manner, but, rather, in a dynamic way.

There are at least three (3) categories of machine learning as follows: (i) supervised learning, where the computer is presented with example inputs and their desired outputs, given by a "teacher", and the goal is to learn a general rule that maps inputs to outputs; (ii) unsupervised learning, where no labels are given to the learning algorithm, leaving it on its own to find structure in its input—unsupervised learning can be a goal in itself (discovering hidden patterns in data) or a means towards an end (feature learning); and (iii) reinforcement learning, where a computer program interacts with a dynamic environment in which it must perform a certain goal (such as driving a vehicle or playing a game against an opponent)—as it navigates its problem space, the program is provided feedback that's analogous to rewards, which it tries to maximize. Some embodiments of the present invention use the unsupervised learning category of machine learning (ML).

Processing proceeds to operation S260, where training mod 304 trains the embedding model using machine learning. The operation of training the embedding model may be discussed in more detail in the next sub-section of this Detailed Description. The training of the embedding model is discussed more specifically in the next sub-section of this Detailed Description section. A training data set is a set of training data that is essentially a subgraph of different transaction composition graphs.

Processing proceeds to operation S265, where graph mod 306 receives first transaction composition graph 307. First transaction composition graph 307 includes information indicative of a transaction composition graph data structure that includes: (i) multiple transaction composition nodes, and (ii) multiple transaction composition connections defined between various pairs of transaction composition nodes. Graph 307 comes from graph supplier sub-system 106, and through communication network 114.

Processing proceeds to operation S270, where receiving first feature vector mod 308 receives a first feature vector 309. Generally speaking, a vector is a set of numbers that characterizes a single set of thing(s), set of entity(ies) and/or set of action(s). For example, Alice is 5 feet, six inches in height and takes the 53 bus every morning to her job in office 3303 in building 256. Therefore: 5, 6, 53, 3303, 256 would be a vector that characterizes Alice and how she gets to work each morning. In embodiments of the present invention that deal with word embedding (for example, word2vec framework), the number of dimensions in the vector space is generally larger and the meaning ascribed to each dimension is not generally meaningful to humans, but only to the computer(s) using the word2vec framework.

Processing proceeds to operation S275, where embedding mod 310 embeds the first transaction composition graph node into a feature vector as vector with embedded graph 311.

Embedding is basically a learning algorithm to transfer a real word entity such as a word document. In the example of the method of flow chart 250, transaction composition graph node is transferred into a latent feature vector so that the latent feature vector can present the entity mathematically. In this example of flow chart 250, the embedding algorithm is a ML algorithm that can only work on feature vectors instead of real-world objects. As those of skill in the art will appreciate, node embedding in a transaction composition graph or TCG involves a series of mathematical operations, which may be further discussed in the following sub-section of this Detailed Description section. Roughly speaking with a more general audience in mind, this embedding of nodes into feature vectors is somewhat analogous to running predictive analyze on a subway system. Each node is analogous to a subway station while the edges of the tcg are analogous to the trackways interconnecting the various subway stations in the subway system. One may want to know, for example, which subway station may be busier or a station where risk of closing is high. The traditional method of determining station status involves collecting statistics such as the number of passengers daily for each station, and generates a feature vector like a spreadsheet row. The embedding method or feature learning algorithm is trying to learn a feature vector using Neural Networks, or other algorithms, so that similar "subway stations" (that is similar nodes of the tcg) will have similar feature vectors. In the method of flow chart 250 the trained ML algorithm is not embedding words but nodes in transaction composition graph. Comparing the method of flow chart 250 to currently conventional graph embedding sampling methods, method 250 is more tailored to solve the transaction composition graph (sometimes also herein referred to as "tcg" and/or "tcm") embedding problem. The method of flow chart 250 argues, or assumes, that transaction normally has directions of data flow or execution sequences with start and end nodes. Start nodes can be the entry point of the current transaction, such as a program or resources/dependencies of the program. End nodes can be database tables, file system, entry point of another transaction, etc.

In some embodiments, the embedding of the first transaction composition graph includes converting a full version of the first transaction composition graph into a corresponding plurality of multiple directed acyclic subgraphs/paths in spanning trees.

In some embodiments, the conversion of the full version of the first transaction composition graph includes: (i) identifying a set of starting node(s) from among the transaction composition nodes; (ii) traversing the full version of the transaction composition graph starting from the set of starting node(s) and (iii) following a data flow of transactions to obtain the corresponding plurality of multiple directed acyclic subgraphs/paths in spanning trees.

In some embodiments, receipt of the first transaction composition graph includes receiving a plurality of transaction composition graphs. In some embodiments, the method further includes, for each given transaction composition graph in the plurality of transaction composition graphs:
selecting a given focus node for the given transaction composition graph,
receiving a connection proximity value N;
selecting a set of focus proximate nodes that are N connections away, or less, from the given focus node, and
inputting the given focus node and the set of focus proximate nodes to a neural network.

In some embodiments, the method further includes:
for each given node of the first transaction composition graph:
generating a corresponding set of one-hot vector(s), and
computing an embedding vector for the given node of the first transaction composition graph from the corresponding set of one-hot vector(s) using a neural network having a hidden layer with weight matrix to compute the embedding vector.

In some embodiments, the method further includes:
computing a probability value reflecting a probability that an output node is proximate an input node using a neural network having a softmax output layer;
determining that the probability value exceeds a threshold value; and
responsive to the determination that the probability value exceeds the threshold value, embedding the output node to a latent feature vector.

III. Further Comments and/or Embodiments

Some embodiments of the present invention may include one, or more, of the following operations, features, characteristics and/or advantages pertaining to a computer-implemented process for transaction composition graph node embedding, the computer-implemented process comprising: (i) in response to receiving at least one transaction composition graph, traversing from the starting node(s) following a data flow of transactions to convert a full graph of at least one transaction composition graph to multiple directed acyclic subgraphs/paths in spanning trees; (ii) for each graph node in a large collection of transaction graphs, as a focus node, taking one-by-one nodes surrounding a respective focus node within a predetermined number as input to a predetermined neural network; (iii) generating a set of one-hot vectors for all nodes; (iv) computing an embedding vector from a corresponding one-hot vector using the predetermined neural network having a hidden layer with weight matrix to compute the embedding vector; (v) computing a probability an output node is nearby an input node using the predetermined neural network having a softmax output layer; and (vi) in response to a determination the probability of the output node is nearby the input node exceeds a predetermined threshold value, embedding the node to a latent feature vector.

Some embodiments of the present invention recognize one, or more, of the following facts, potential problems and/or potential areas for improvement with respect to the current state of the art: (i) a method for transaction composition graph node embedding; (ii) trains an embedding model to embed a transaction graph node into a feature vector; (iii) is specifically designed for use with a specific to transaction composition graph; (iv) describes a specific application of how a graph node embedding method can be applied to transaction composition analysis; (v) collects and understands the domain knowledge of computer transaction composition; and (vi) has the ability to process a computer transaction composition map into a graph with a start node.

Some embodiments of the present invention recognize one, or more, of the following facts, potential problems and/or potential areas for improvement with respect to the current state of the art: (i) a transaction usually means a sequence of program executions and data processing (such as database updating) that is treated as a unit for the purpose of fulfilling a request; (ii) a transaction can link multiple individual operations in a single, indivisible transaction; (iii) ensures that either all operations in a transaction are completed without error, or none of them are; (iv) in the transaction software layer, transactions contain different kinds of software artifacts such as programs, database tables, and files; and/or (v) software artifacts interact and work in certain sequences to complete a transaction (for example, Program A calls Program B, and Program B writes data to the database).

Some embodiments of the present invention recognize one, or more, of the following facts, potential problems and/or potential areas for improvement with respect to the current state of the art: (i) transactions within a project could be analyzed using a transaction composition graph; (ii) the transaction composition graph shows all artifacts (for example, transactions, programs, and database tables) called out in a transaction; (iii) the transaction composition graph gives the visual overview structure about the transaction; (iv) the transaction composition graph also allows users to analyze potential risk, or interest areas, of all the artifacts within a transaction, based on relationships; and/or (v) for enterprise applications, the composition of transactions are normally very complex, (for example, involves tens of thousands of program artifacts, complex call relationships, and structures.

Some embodiments of the present invention recognize one, or more, of the following facts, potential problems and/or potential areas for improvement with respect to the current state of the art: (i) analyzing the graph could be very time-consuming and labor-intensive for users to analyze manually; (ii) other computer programs or AI (artificial intelligence) agents are needed to analyze and process such complex composition graphs for users; (iii) in order to perform numeric or predictive analysis (such as calculating the risk or importance of each artifact/node and be able to rank them or classify each artifact to assign certain labels, such as belong to a business rule or clustering/grouping related or similar artifacts) each artifact should be able to be presented or described as a numeric feature vector; and/or (iv) when the transaction composition and program static analysis data are available, the amount of data could be huge and presents difficulties when users drill down to the whole application, to an application parts level, and try to find the problem themselves.

Some embodiments of the present invention may include one, or more, of the following operations, features, characteristics and/or advantages: (i) a specific transaction composition graph node embedding method to embed each node/artifact on the graph to a latent feature vector; (ii) can be described as a refinement to general Node2Vec graph embedding methodology; (iii) determines the direction or sequence of data flow, since transactions normally have a starting node(s) and an end node(s); (iv) instead of adopting random walk sampling in Node2Vec on a graph, graph traversal from the starting node to the ending node can be started (following the data flow) to convert the full directed cyclic graph to multiple directed acyclic subgraphs; (v) a skip-diagram model will be applied to each subgraph to embed the artifact into a latent feature vector; and/or (vi) a program artifact is a node in a transaction composition graph.

Some embodiments of the present invention may include one, or more, of the following operations, features, characteristics and/or advantages: (i) transaction composition graphs contain artifacts like transaction, program, copybook, database table, etc.; (ii) each artifact can be defined as a node on the graph; (iii) each edge is a triple, representing the relationship between two nodes (for example HCP1BA01 calls HCAPDB01, and HCAPDB01 writes to patient table); and (iv) a graph building module builds a directed cyclic or acyclic graph and can be applied with graph embedding methods to convert the nodes into latent feature vectors. The names of the three (3) known graph embedding methods are: DeepWalk, Node2Vec, Structural Deep Network embedding (SDNE).

Some embodiments of the present invention may include one, or more, of the following operations, features, characteristics and/or advantages: (i) in a traditional Node2Vec algorithm, uses sampling strategies to sample the full graph and generate a group of directed acyclic subgraphs; (ii) generates random walks from each node of the graph; (iii) the skip-gram model will be built to embed nodes located, in the subgraphs, into latent feature vectors; (iv) transactions normally have directions of data flow or execution sequences with start nodes and end nodes; (v) start nodes can be the entry point of the current transaction, such as a program or resources/dependencies of the program; and/or (vi) end nodes can be database tables, a file system, an entry point of another transaction, etc.

Some embodiments of the present invention may include one, or more, of the following operations, features, characteristics and/or advantages: (i) one dataflow could be: HCP1MAP (BMF file) used by→HCP1PL01 (Program) calls→HCP1BA01 (Program) calls→HCAPDB01(Program)→calls PATIENT (database table); (ii) dataflow information can be leveraged to improve the performance of node embedding of the transaction composition graph; and/or (iii) instead of adopting random walk sampling on a graph, graph traversal can be started from the starting node(s) following the data flow to convert the full graph to multiple directed acyclic subgraphs or paths in spanning trees.

Some embodiments of the present invention may include one, or more, of the following operations, features, characteristics and/or advantages: (i) each path from root to leaf in the spanning trees can be viewed like a sentence or word sequence, with each node representing a word; (ii) feed a neural network by: (a) taking every graph node in a large collection of transaction graphs as the focus node, and (b) take one-by-one the nodes that surround it within a defined 'window'; and/or (iii) after training, the neural network will predict the probability for each node to actually appear in the window around the focus node.

The following is an example of computer code according to an embodiment of the present invention: MapA→ProgramA→ProgramB→ProgramC→Database A, where we have a window sized with 3, then we could have the following context and training pairs examples:

```
(MapA-> ProgramA -> ProgramB) -> ProgramC -> Database A
Training pairs: (MapA, ProgramA), (MapA, ProgramB)
(MapA-> ProgramA -> ProgramB) -> ProgramC -> Database A
Training pairs: (ProgramA, MapA), (ProgramA, ProgramB)
(MapA-> ProgramA -> ProgramB) -> ProgramC -> Database A
Training pairs: (ProgramB, MapA), (ProgramB, ProgramA)
```

Some embodiments of the present invention may include one, or more, of the following operations, features, characteristics and/or advantages: (i) build one-hot vectors for all nodes (for example, MapA becomes (1, 0, 0, 0, 0 . . . 0) as the input vector in neural network training and ProgramA becomes (0, 1, 0, 0, 0 . . . 0) as the output vector in neural network training); (ii) a neural network designed for embedding the transaction composition graph node follows the architect design of the skip-gram model; (iii) includes a hidden layer with a weight matrix to compute the embedding vector from one-hot vector; (iv) includes a softmax output layer to generate the probability that the output node is near the input node; and/or (v) after training with a huge amount of artifact node pairs, the hidden embedding layer should be able to build accurate embedding vectors for each artifact on the composition graph.

Figure 4A:
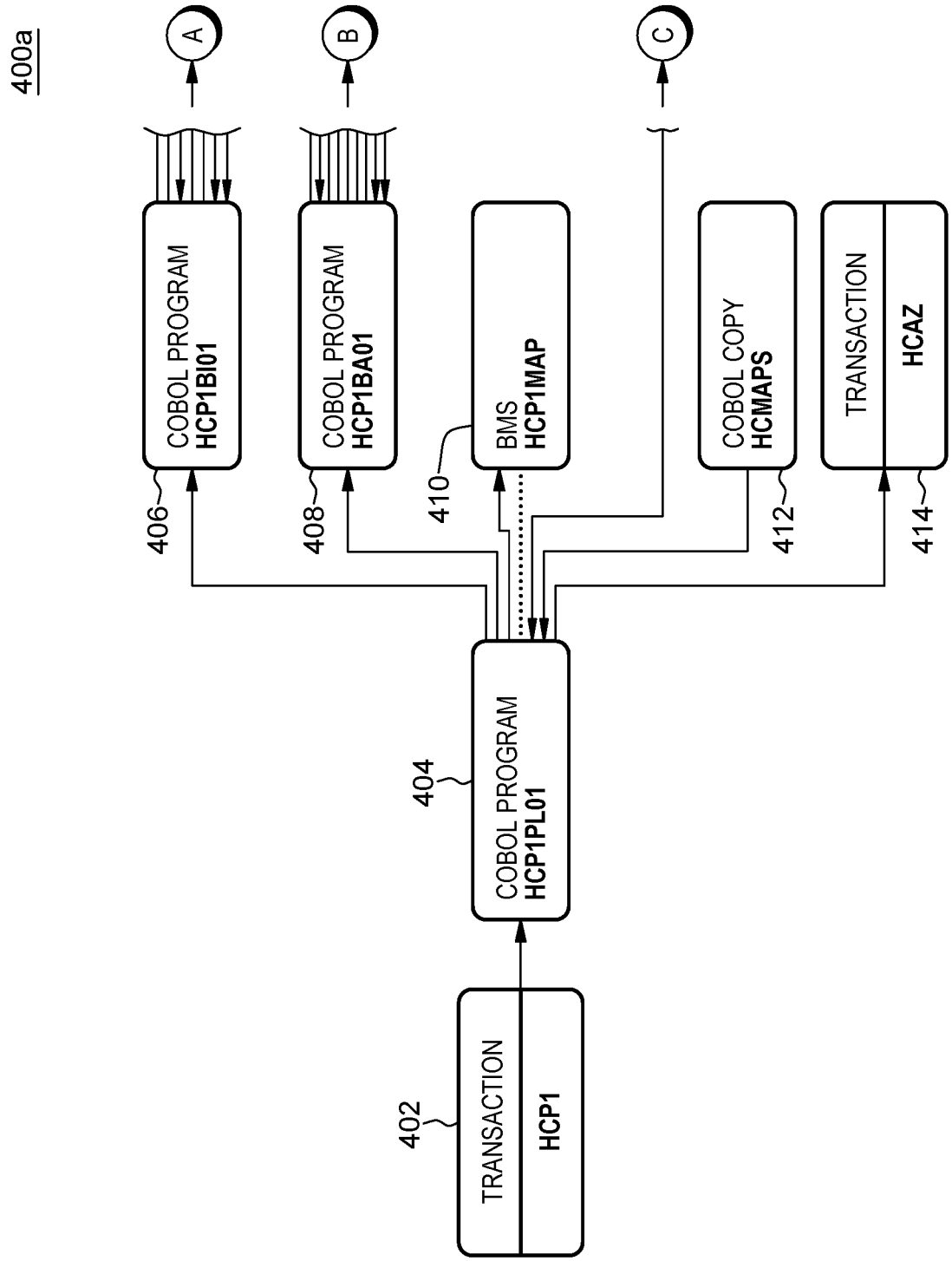
FIGS. 4A, 4B and 4C together make up a diagram according to an embodiment of the present invention.
Figure 4B:
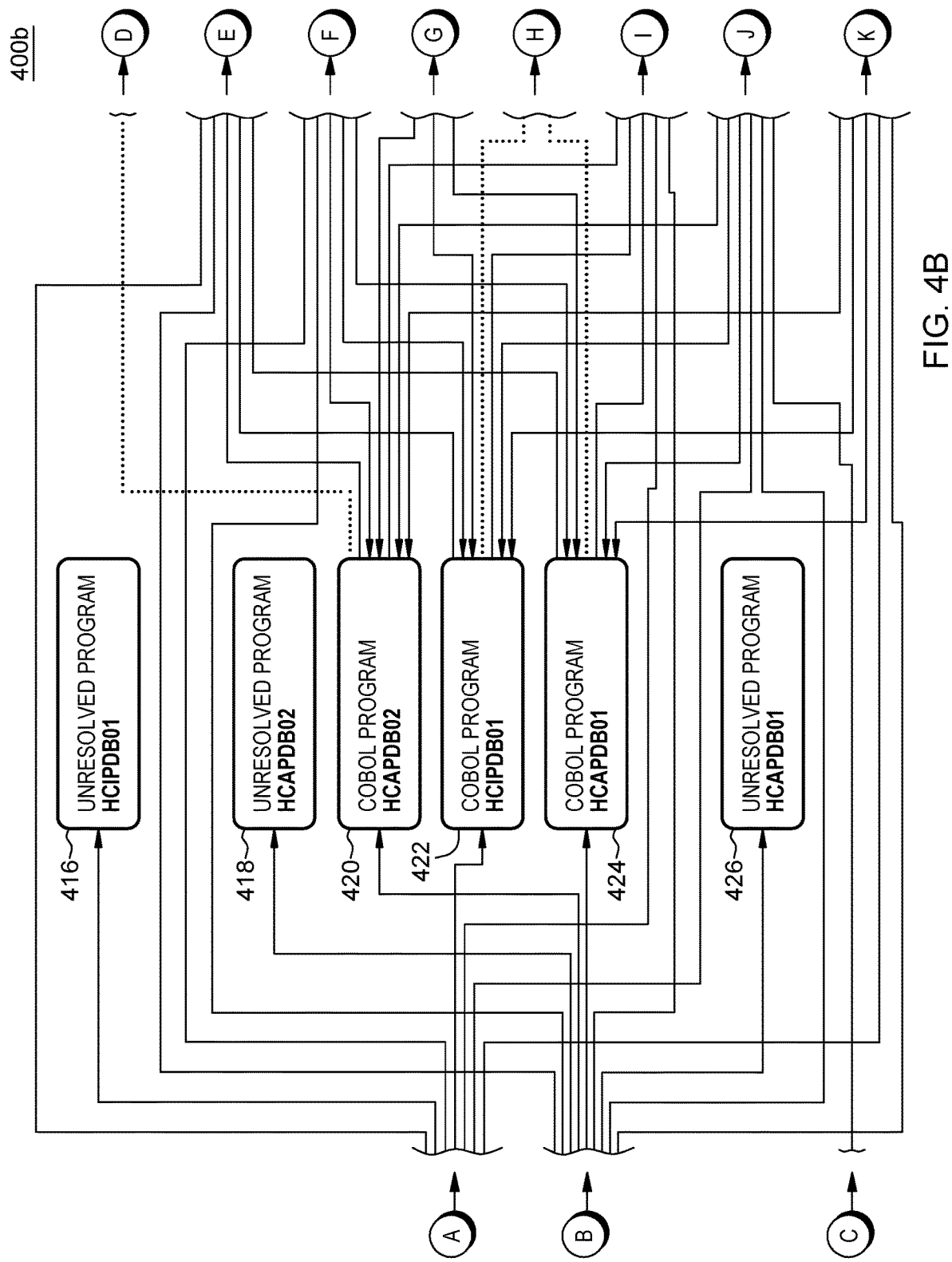
Figure 4C:
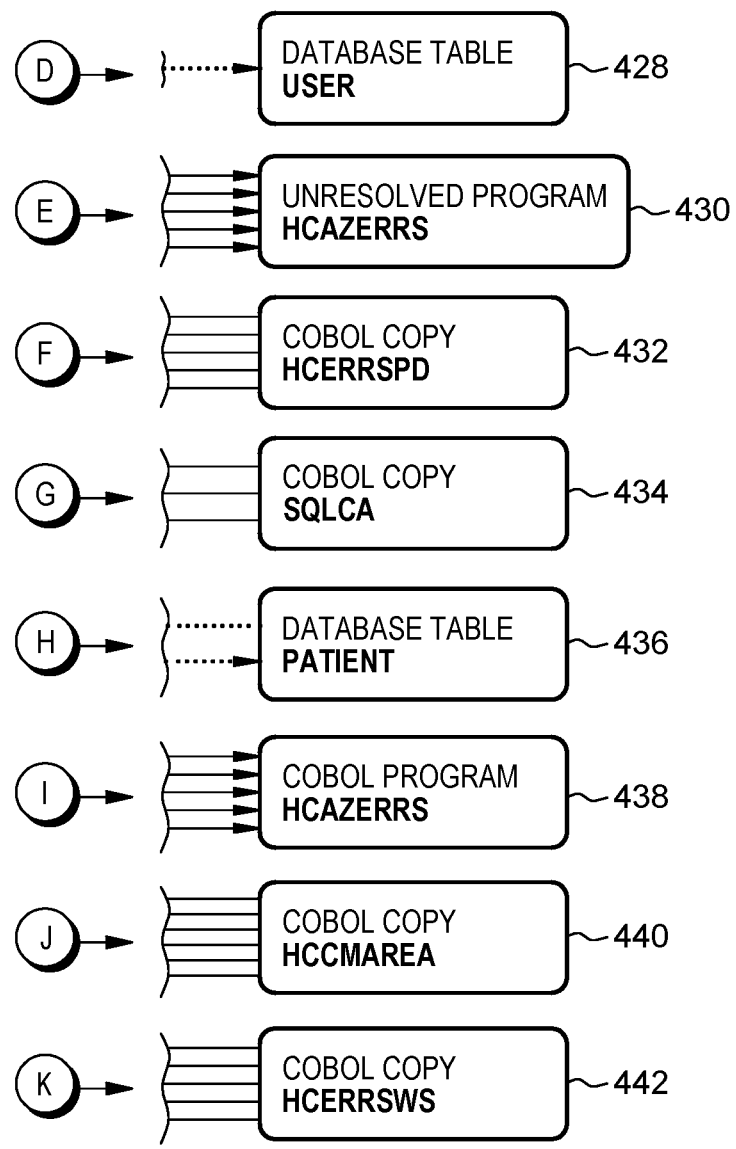

As shown in FIGS. 4A, 4B, and 4C, diagram 400 includes diagrams 400a, 400b, and 400c. Diagram 400 represents a transaction composition graph that includes: transaction HCP1 block 402; COBOL (common business-oriented language) program HCP1PL01 block 404; COBOL program HCP1BI01block 406; COBOL program HCP1BA01 block 408; BMS (battery management system) HCP1MAP block 410; COBOL copy HCMAPS block 412; transaction HCAZ block 414; unresolved program HCIPDB01 block 416; unresolved program HCAPDB02 block 418; COBOL program HCAPDB02 block 420; COBOL program HCIPDB01 block 422; COBOL program HCAPDB01 block 424; unresolved program HCAPDB01 block 426; database table USER block 428; unresolved program HCAZERRS block 430; COBOL copy HCERRSPD block 432; COBOL copy SQLCA block 434; database table PATIENT block 436; COBOL program HCAZERRS block 438; COBOL copy HCCMAREA block 440; COBOL copy HCERRSWS block 442; and figure connection points A, B, C, D, E, F, G, H, I, J, and K.

Some embodiments of the present invention recognize one, or more, of the following facts, potential problems and/or potential areas for improvement with respect to the current state of the art: (i) numeric/predictive analysis on each node (artifact) can be challenging, such as: (a) calculating the risk or importance for each node, and (b) classifying each node; and (ii) given enterprise-level large and complex transactions may not be able to find related or similar artifacts including: (a) related artifacts may work together to implement the same business rule, and (b) related artifacts may have impact with each other.

Some embodiments of the present invention may include one, or more, of the following operations, features, characteristics and/or advantages: (i) propose a specific transaction composition graph node embedding method to embed each node/artifact on the graph to a latent feature vector; (ii) transactions normally have starting node(s) and end node(s) determining the directions of data flow; (iii) instead of using random walk on the graph, graph traversal is started from the starting node to the ending node (following the data flow) to convert the full graph to multiple spanning trees; (iv) a skip-diagram model will be applied on each subgraphs to embed artifacts into latent feature vectors; and/or (v) word2vec or embedding algorithm outputs a feature vector or latent feature vector if it is desired to compare with an explicit feature vector generated by feature engineering.

Figure 5A:
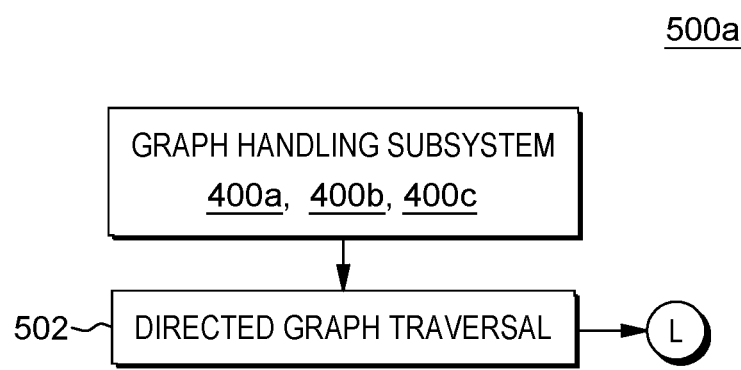
FIGS. 5A, 5B and 5C are block diagram views according to an embodiment of the present invention.
Figure 5B:
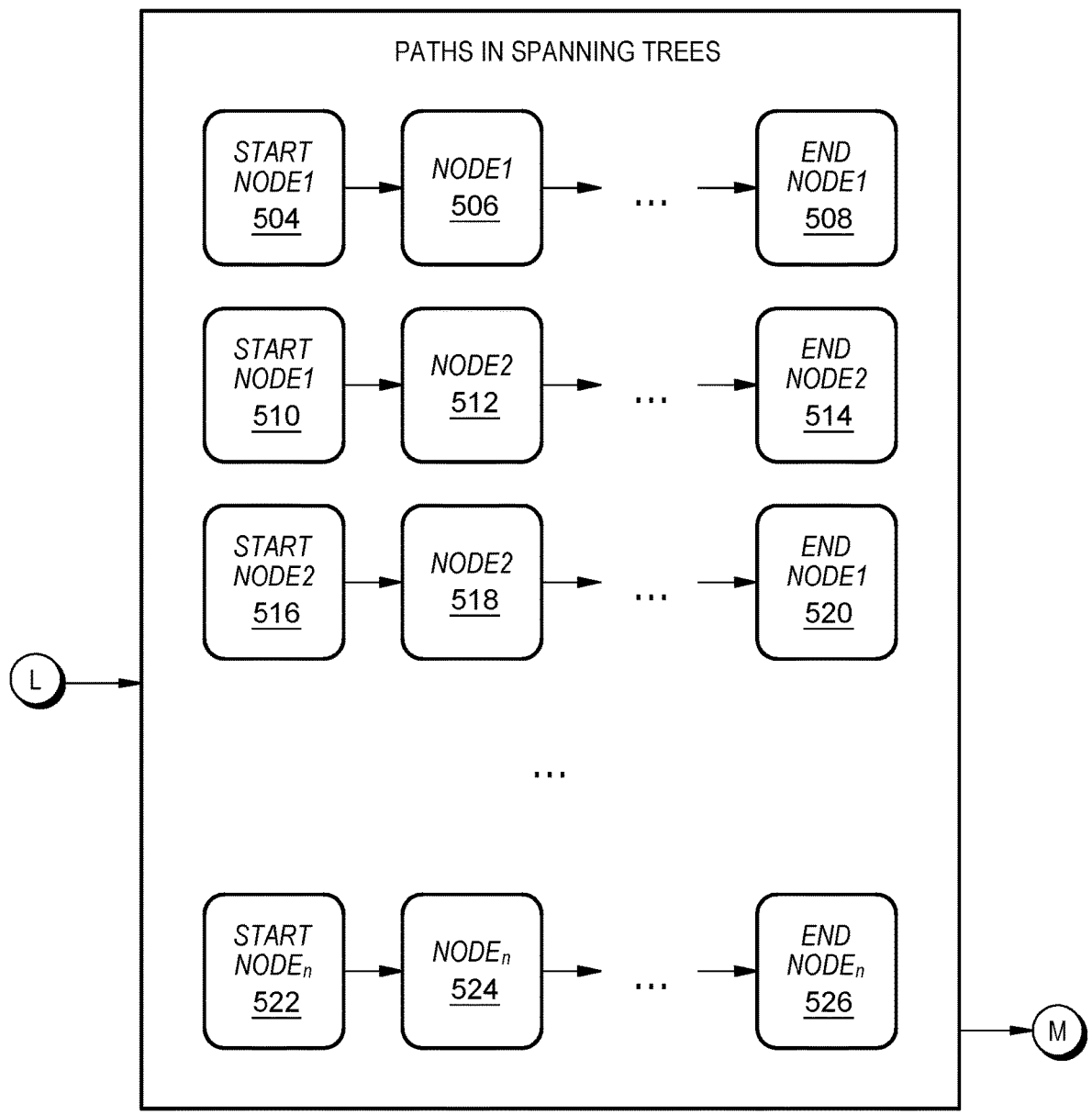
Figure 5C:
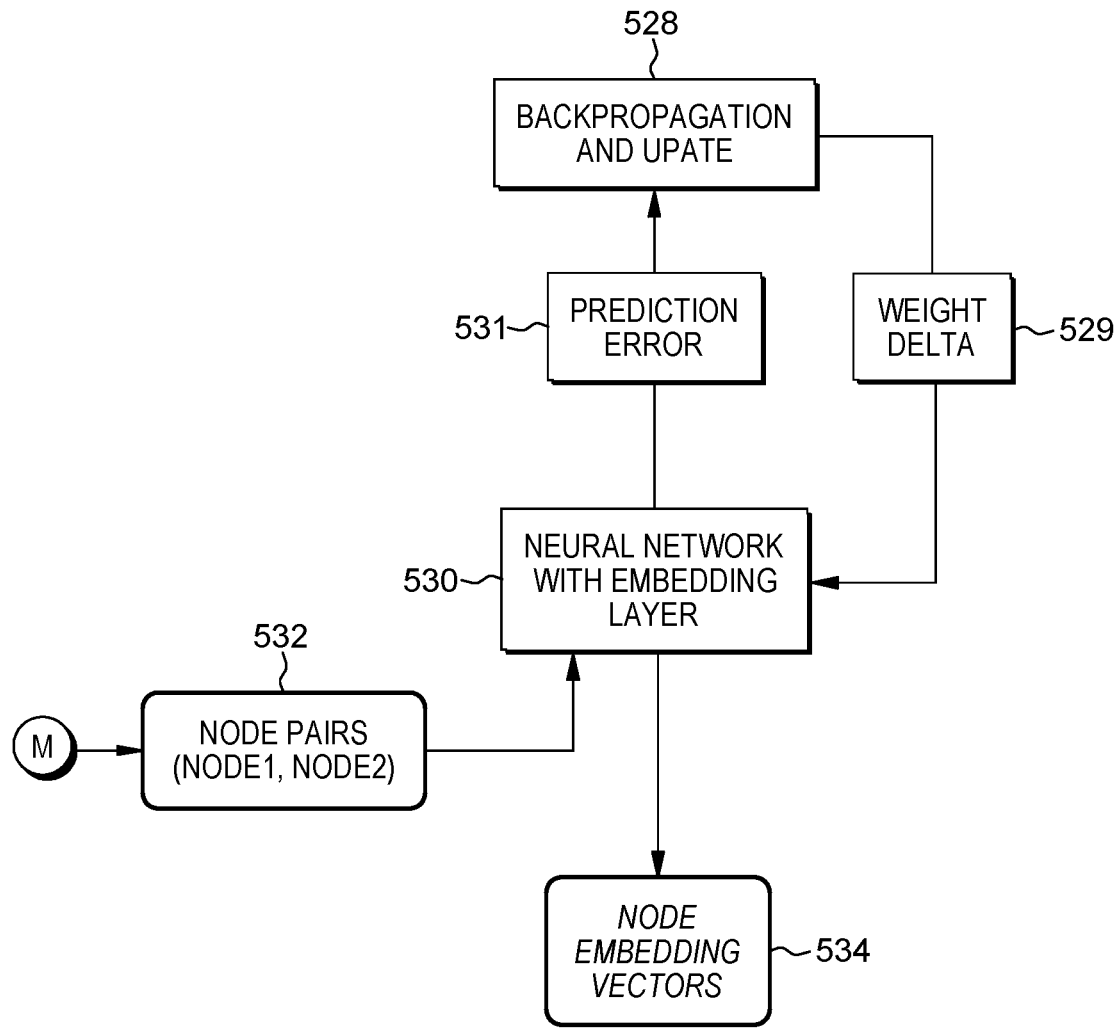

As shown in FIGS. 5A, 5B, and 5C, sub-system diagrams 500a, 500b, and 500c respectively, include: directed graph traversal block 502; start node1 block 504, node1 block 506; end node1 block 508; start node1 block 510; node2 block 512; end node2 block 514; start node2 block 516; node2 block 518; end node1 block 520; start node$_n$ block 522; node$_n$ block 524; end node$_n$ block 526; backpropagation and update block 528; weight delta block 529; neural network with embedding layer block 530; prediction error block 531; node pairs (node1, node2) block 532; node embedding vectors block 534; and figure connection points L and M.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

Set of thing(s): does not include the null set; "set of thing(s)" means that there exist at least one of the thing, and possibly more; for example, a set of computer(s) means at least one computer and possibly more.

What is claimed is:

1. A computer-implemented method (CIM) comprising:
receiving a plurality of transaction composition graphs with each transaction composite graph including a plurality of nodes including a starting node;
for each given transaction composite graph of the plurality of transaction composition graphs, traversing the given transaction composite graph from the starting node and following a data flow of transactions to convert the given transaction composition graph into a respectively corresponding directed acyclic subgraph representing a spanning tree corresponding to nodes and edges of the given transaction composite graph;
for each given node of each given plurality of nodes of each given transaction composite graphs of the plurality of transaction composite graphs, taking one-by-one nodes surrounding the given node within a predetermined number of edge connections with respect to the given node as input to a predetermined neural network;
for each given node of each given plurality of nodes of each given transaction composite graphs of the plurality of transaction composite graphs, generating a set of one-hot vectors for the given node;
for each given node of each given plurality of nodes of each given transaction composite graphs of the plurality of transaction composite graphs, computing an embedding vector based on the one-hot vector corresponding to the given node using a hidden layer of the predetermined neural network, with the computation of the embedding vector including application of a weight matrix to the one-hot vector; and
using the embedding vector to analyze areas of interest within the plurality of transaction composite graphs.

2. The CIM of claim 1 further comprising:
computing a probability value corresponding to a probability that an output node is nearby an input node using a softmax output layer of the predetermined neural network;
determining that the probability value exceeds a predetermined threshold value; and
in response to a determination that the probability value exceeds the threshold value, embedding the input node to a latent feature vector.

3. The CIM of claim 2 wherein
each transaction composition graph of the plurality of transaction composition graphs represents a plurality of database updating transactions.

* * * * *